Mar. 27, 1923.
LE ROY H. RAND.
MACHINE FOR CUTTING SHEET RUBBER.
FILED NOV. 15, 1921.
1,449,445.
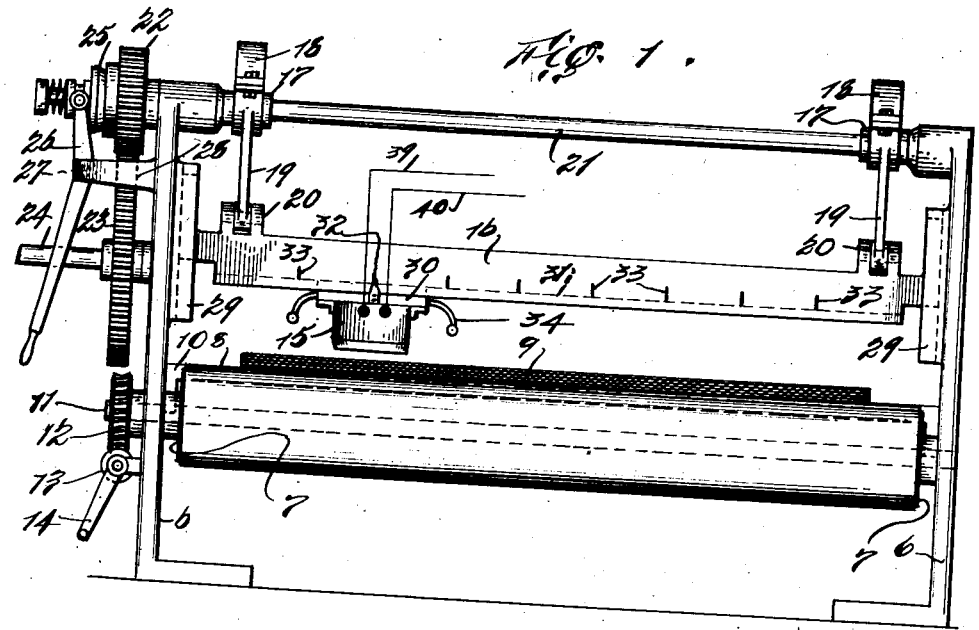
Fig. 1.
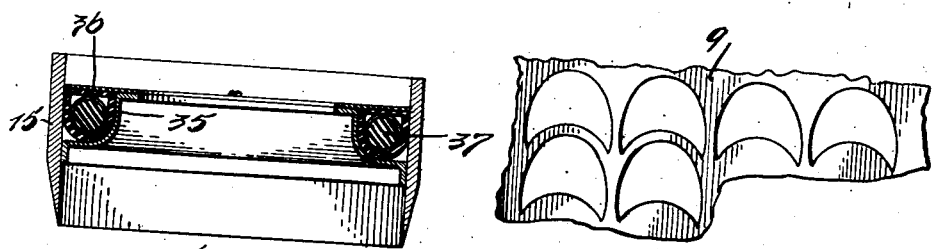
Fig. 2.
Fig. 4.
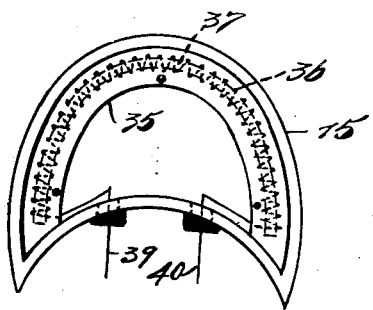
Fig. 3.
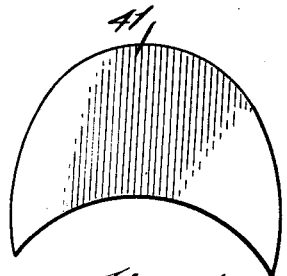
Fig. 5.
Inventor
LeRoy H. Rand
By his Attorney
Philip C. Peck Patented Mar. 27, 1923.

1,449,445

UNITED STATES PATENT OFFICE.

LE ROY H. RAND, OF BROOKLYN, NEW YORK, ASSIGNOR TO BROOKLYN SHIELD & RUBBER COMPANY, OF BROOKLYN, NEW YORK, A CORPORATION OF NEW YORK.

MACHINE FOR CUTTING SHEET RUBBER.

Application filed November 15, 1921. Serial No. 515,274.

*To all whom it may concern:*

Be it known that I, LE ROY H. RAND, a citizen of the United States, and a resident of the borough of Brooklyn, in the county of Kings, city and State of New York, have invented certain new and useful Improvements in Machines for Cutting Sheet Rubber, of which the following is a specification, reference being made to the accompanying drawings, forming a part thereof.

My improved machine relates to the cutting of superimposed layers of sheet rubber stacked in a vertical pile by a single operation of the cutters or dies, and the objects of my invention are, among other things, to provide a simplified machine whereby such cutting of a plurality of sheets of rubber may be performed with greater rapidity and efficiency than has heretofore been possible.

The former practice in cutting layers of superimposed sheets of rubber usually arranged in piles of 50 to 75 sheets by dies or cutters was to interpose layers of a suitable pulverized material, such as starch, between the separate layers or sheets to prevent the dies, while cutting, from matting together the sheets edges causing the uncured rubber forms to be undesirably stuck along their exterior edges, as well as necessitating the brushing out of the starch or pulverized material after the cutting operation had been completed. I have discovered that this slow and expensive method of sandwiching starch or other pulverized material between the separate layers of sheet rubber forming the pile before the cutting operation, and the subsequent removal of such material when the forms had been cut, may be wholly dispensed with by the application of heat to the cutters or dies during the cutting operation. Such heat may be applied in any advantageous manner, and I have discovered that when such dies are heated to a degree slightly below the melting point of the sheet rubber the combined application of pressure and heat upon the dies is sufficient to readily cut with clean and well-defined edges through a pile of 50 or 75 sheets of rubber which has had no intervening layers of starch applied between the contiguous sheets, and without in any way matting or undesirably tearing or marring the exterior edges of the sheet rubber forms. My improved machine is adapted to be used in cutting out any sheet rubber forms, such as dress-shields, bathing-caps and other similar articles, which can be cut from uncured rubber with greatly increased rapidity and effectiveness when the dies are properly heated when pressed into the pile during the cutting operation.

These and other objects of my invention will be hereinafter fully set forth and particularly pointed out in the appended claims. A preferred embodiment of a machine which embodies my invention is shown in the accompanying drawings, which illustrate, by way of example, an apparatus suitable for carrying out my improvements.

In the drawings Fig. 1 shows a front elevation view of the improved machine for operating the die or cutter;

Fig. 2 is an enlarged cross-sectional view of a form of die or cutter that may be used;

Fig. 3 is a top plan view of the die on a somewhat reduced scale;

Fig. 4 is a fragmentary view showing a portion of a sheet of rubber material out of which dress-shield forms (taken for illustration) are cut; and Fig. 5 is an enlarged face view of a dress-shield as cut by my machine.

Similar numerals refer to similar parts throughout the several Figures.

Referring to Fig. 1, the framework 6 supports a pair of horizontally spaced-apart drums 7 (only one being shown) journalled in the frame 6, upon which drums revolves the endless belt 8 which supports a plurality of layers of sheet-rubber 9 arranged in a vertical pile. The table 10 is secured to the frame 6, and the belt 8 passes over same, the table affording a backing for the die during the cutting operation. Means are provided to horizontally move the belt 8 with the pile 9 by rotating one of the drums 7: In the present instance the drum shaft 11 has secured thereto the worm-gear 12 enmeshing with the worm 13 operated by the crank 14.

The die or cutter 15 is carried by a vertically reciprocable head 16 which is raised and lowered by eccentrics 17 carrying straps 18 which are connected by rods 19 pivotally secured to the head brackets 20. The eccentrics 17 are affixed to the transverse shaft 21 journalled in the frame 6, and are rotated by the coacting gears 22 and 23, gear 22 being loose on the shaft 21 while gear 23 is fastened to the shaft 24 which is rotated by any suitable means not necessary to be shown. Gear 22 is operatively connected to the shaft 21 by the clutch 25 operated by the hand lever 26 pivoted at 27 to the bracket 28 secured to the frame 6.

The die head 16 slides in the vertical guides 29 fastened to the frame 6 to hold the head 16 in proper alinement with the pile 9. The die or cutter 15 is mounted on the transverse slide member 30 which is adapted to move longitudinally of the head by running along the guideway 31 located along the lower edge of the head 16. The die 15 carries the indicator 32 to set the die 15 in predetermined positions on the head. In starting the cutting operation in my machine the die 15 will be positioned at the extreme left or right end of the head 16 with the indicator 32 in register with the scale marks 33 suitably formed in the surface of the head 16 as shown for the first operation which will take place during a single revolution of the shaft 21. Thereafter the die 15 will be moved transversely to the next scale mark 33 by the handles 34 secured to the die 15 as shown.

Means are provided to suitably heat the die 15 to a degree slightly below the melting point of the sheet rubber to be cut in my improved machine: In the present instance I have shown electric heating means best shown in Figs. 2 and 3; other means for heating the die, such as gas, may be used to advantage, but I prefer electricity because such form of heat may be readily controlled to the proper degree readily to cut the sheet rubber to the best advantage. Located within the casing 35 of the die 15 is the electrical resistance coil 36 wound on the core 37 of insulating material. 39 and 40 designate leads to connect the coil 36 with any suitable source of electrical energy not shown.

The operation of my machine in cutting dress-shields, for example, is as follows: The electrical current is turned on to suitably heat the die 15 which is set on the head 16 at the extreme right or left position as hereinbefore described. The operator then throws in the clutch 25 to operatively connect the gear 22 with the shaft 21 which causes the head 16 to be lowered to the pile 9 by the eccentrics 17 in the usual manner. When the die 15 is lowered and forced into the pile 9 by the action of eccentrics 17, the combined effect of the pressure and heat from the die 15 causes the latter to readily cut through several layers of the pile 9, which usually consists of from 50 to 75 sheets of rubber stacked together, without in any way matting the edges. The head 16 is then raised during the remainder of the cycle after which the clutch 25 is disconnected. Then the die 15 is moved to the next scale mark 33 and the cutting operation is repeated through another revolution of the shaft 21, and so on until the die 15 has been moved the entire length of the head 16. After a row of shields 41 (Fig. 5) has been cut as shown in Fig. 4, the drum 7 will be rotated by crank 13 which will advance the pile 9 by causing a forward movement of the belt 8 after which another row of shields 41 will be cut with the die 15 intermittently operated by means of the clutch 25, one revolution of the shaft serving to lower and raise the die in a complete cycle of the cutting operation; the head 16 will be held stationary while the die 15 is being shifted.

My improved machine for cutting sheet rubber may be changed in details without departing from the principles and scope of the invention, which consists primarily in utilizing heated dies combined with pressure in simultaneously cutting a plurality of sheet-rubber forms from a superimposed pile without in any way matting or marring the edges.

I claim as my invention:

1. In a machine of the class described, a manually controlled, longitudinally movable support for a pile of sheets of rubber, a vertically reciprocable cutting die, means for heating said die carried within the die adjacent the cutting edge, means for shifting said die transversely of the pile, and manually controlled, power-operated means for intermittently forcing the die while heated through the pile.

2. In a machine of the class described, a manually controlled, longitudinally movable support for a pile of sheets of rubber, a vertically reciprocable cutting die, means for heating said die carried within the die adjacent the cutting edge, means for shifting said die transversely of the pile to predetermined positions, and manually-controlled, power-operated means for intermittently forcing the die while heated through the pile.

3. In a machine of the class described, a manually controlled, longitudinally movable support for a pile of sheets of rubber, means for moving said support longitudinally of the machine, a vertically reciprocable cutting die, means for heating said die carried within the die adjacent the cutting edge, and manually-controlled, power-operated means for intermittently forcing the die while heated through the pile.

4. In a machine of the class described, a manually controlled, longitudinally movable support for a pile of sheets of rubber, means for moving said support longitudinally of the machine, a vertically reciprocable cutting die, means for heating said die carried within the die adjacent the cutting edge, means for shifting said die transversely of the pile, and manually-controlled, power-operated means for intermittently forcing the die while heated through the pile.

5. In a machine of the class described, a manually controlled, longitudinally movable support for a pile of sheets of rubber, means for moving said support longitudinally of the machine, a vertically reciprocable cutting die, means for heating said die carried within the die adjacent the cutting edge, means for shifting said die transversely of the pile to predetermined positions, and means for intermittently forcing the die while heated through the pile.

6. In a machine of the class described, a pair of spaced-apart drums transversely journalled in the frame, an endless belt conveyor-support for a pile of sheets of rubber passing around said drums, manual means for rotating one of said drums to actuate said support, a vertically-reciprocating cross-head slidably mounted in said frame, a transverse driven shaft journalled in the frame, an operable connection comprising eccentric devices between said cross-head and driven shaft to raise and lower said head from and to said pile, a cutting die adjustably carried on said cross-head, means for heating said die carried within the die adjacent the cutting edge, and a manually-operated clutch for connecting said transverse shaft with a source of power.

7. In a machine of the class described, a pair of spaced-apart drums transversely journalled in the frame, an endless belt conveyor-support for a pile of sheets of rubber passing around said drums, manual means for rotating one of said drums to actuate said support, a vertically-reciprocating cross-head slidably mounted in said frame, a transverse driven shaft journalled in the frame, an operable connection comprising eccentric devices between said cross-head and driven shaft to raise and lower said head from and to said pile, a cutting die adjustably carried on said cross-head, means for heating said die carried within the die adjacent the cutting edge, manual means for shifting the die to predetermined positions on the cross-head, and a manually-operated clutch for connecting said transverse shaft with a source of power.

8. In a machine of the class described, a pair of spaced-apart drums transversely journalled in the frame, an endless belt conveyor-support for a pile of sheets of rubber passing around said drums, manual means for rotating one of said drums to actuate said support, a vertically-reciprocating cross-head slidably mounted in said frame, a transverse driven shaft journalled in the frame, an operable connection comprising eccentric devices between said cross-head and driven shaft to raise and lower said head from and to said pile, a cutting die adjustably carried on said cross-head, means for heating said die carried within the die adjacent the cutting edge, a scale mounted on said head and an indicator on said die whereby the relative positions of said die and head may be fixed to predetermined positions, and a manually-operated clutch for connecting said transverse shaft with a source of power.

LE ROY H. RAND.